United States Patent [19]
Moe et al.

[11] Patent Number: 5,369,538
[45] Date of Patent: Nov. 29, 1994

[54] ROTARY DISK DRIVE ACTUATOR

[75] Inventors: Erik Moe, Huntington Beach; Greg H. Goble, Irvine; Leland R. Krueger, Tustin, all of Calif.

[73] Assignee: Mitsumi Electric Co., Ltd., Kanagawa, Japan

[21] Appl. No.: 975,386

[22] Filed: Nov. 12, 1992

[51] Int. Cl.⁵ .......................... G11B 5/54; G11B 21/22
[52] U.S. Cl. ........................................ 360/106; 360/105
[58] Field of Search .................................. 360/106, 105

[56] References Cited
U.S. PATENT DOCUMENTS

| | | | |
|---|---|---|---|
| 4,635,151 | 1/1987 | Hazebrouck | 360/105 |
| 4,716,482 | 12/1987 | Walsh | 360/106 |
| 4,845,579 | 7/1989 | Wilkinson, Jr. | 360/106 |
| 4,890,176 | 12/1989 | Casey et al. | 360/105 |
| 4,949,206 | 8/1990 | Phillips et al. | 360/106 |
| 4,996,617 | 2/1991 | Yaeger et al. | 360/105 |
| 5,023,736 | 6/1991 | Kelsic et al. | 360/105 |
| 5,034,837 | 7/1991 | Schmitz | 360/105 |

*Primary Examiner*—Robert S. Tupper
*Attorney, Agent, or Firm*—Knobbe, Martens, Olson & Bear

[57] ABSTRACT

An actuator assembly for a disk drive is presented which includes a voice coil motor having a top return plate which is held in place substantially only by the magnetic field of the voice coil motor magnet, and no extra screws or other fasteners are needed. Non-magnetic spacers position the top return plate above the voice coil motor magnet. Consequently, there are no magnetic portions to interfere with the desired return path of the magnetic field. The actuator assembly includes a preloaded crash stop which provides an elastic as well as a dampening resistive force in stopping a positioner arm assembly upon a crash. Additionally, the crash stop is comprised substantially of non-magnetic material so as to avoid interfering with desired magnetic return paths required for the operation of the actuator. Furthermore, the crash stop comprises an integral magnetic latch which holds the positioner arm assembly in a fixed location when the disk drive is not operating. The magnetic latch provides "line contact," rather than "surface contact," between the positioner arm and the magnetic poles of the latch, thus allowing for greater margin of error in positioning and assembling the components of the latch and positioner arm.

15 Claims, 9 Drawing Sheets

ROTARY DISK DRIVE ACTUATOR

FIELD OF THE INVENTION

The present invention relates generally to rotary actuators for use in magnetic disk drives, and more particularly is directed to a crash stop and latching assembly for holding an actuator carriage at a predetermined stop position. The invention also combines advantageous features to optimize the flux path of the actuator and also simplify assembly of very small form factor disk drives.

BACKGROUND OF THE INVENTION

In hard or floppy disk drive systems, a read/write head is moved across a data storage disk so as to be positioned over a selected one of a large number of substantially circular, concentric tracks. The disks have magnetic coatings on the surfaces within the tracks to provide memories for bits of data which can be randomly accessed at high speed for either retrieving or storing data. The read/write head is mounted on the end of an arm of a pivot actuator carriage so as to be positioned at the desired track by an actuator motor.

Typically, in hard disk drive systems, a plurality of disks are stacked on a spindle and a corresponding plurality of magnetic heads are used to read or write on respective surfaces of the disks. The magnetic heads ride on a thin layer of air created by the spinning disk with the heads being in close proximity to, but spaced from, the disk surface. When power is turned off, the actuator carriage is driven to move the magnetic heads to data-free parking or landing zones on which they may rest without destroying information, which is recorded only in other areas of the disks. Because of the rapid movement of the actuator assembly, a device is needed to limit the deceleration of the pivoting arm, in case of error or loss of power, to minimize damage to the head at the distal end of the arm.

Generally, a crash stop is provided to limit further movement of the actuator carriage once it reaches its stop position in the parking zone. The crash stop is conventionally in the form of a spring, or often simply a piece of viscoelastic material, arranged to impact a portion of the proximal end of the actuator arm at each limit of travel. Due to the relatively small size of small form factor disks, it is a significant part of the design of the disk drive to precisely position the actuator carriage at its stop position so as to minimize the area of the parking zone, which is essentially wasted disk surface space since no information is recorded thereon.

When the disk drive is not in use, it is important to park and hold the magnetic heads in a position where they cannot be moved and accidentally damage the data stored on the disk. To hold the actuator assembly in place while the drive is not in use, a latching arrangement is typically provided. One common latching arrangement utilizes a selectively actuated solenoid to hold the carriage assembly in place. Such systems have drawbacks, including the need for supporting electronics, relying on moving parts, and typically occupy large spaces or detract from the balance of the carriage assembly. Various types of magnetic latches have been proposed, generally positioning two opposing poles of a magnet close to a plate on the rear end of the actuator assembly so that when the actuator nears the parking zone, the plate will be attracted by the magnet.

Several U.S. patents have disclosed ways to limit the size of the parking zone on a data disk by providing a crash stop comprising a preloaded spring, and also to hold the actuator in place in the parking zone by providing a magnetic latch assembly. U.S. Pat. No. 4,635,151 to Hazebrouck discloses a rotary actuator with a crash stop comprised of a preloaded metallic leaf spring. In U.S. Pat. No. 4,890,176 to Casey, et al., a crash stop and magnetic latch for a voice coil actuator is disclosed. In U.S. Pat. No. 5,023,736 issued to Kelsic, et al., another type of magnetic latch for a disk drive actuator is shown. In U.S. Pat. No. 5,034,837 to Schmitz, a further type of magnetic actuator lock for a small form factor drive is shown.

The force exerted by a purely elastic (spring force) crash stop is approximately proportional to its deflection, and the maximum deceleration experienced by the actuator and attached head is at the final point of travel when the spring force is greatest. Consequently, previous devices have preloaded the spring crash stop to decrease the amount of deflection needed to stop the actuator and thus decrease the size of the parking zone on the disk. Ideally, preloaded spring crash stops function to slow the actuator's rotation in a minimum space. However, the spring force cannot be too great as the deceleration of the actuator will damage the magnetic head just as if it were a solid crash stop. Thus, even preloaded spring crash stops must have a minimum distance of deflection to absorb the kinetic energy of the rotating actuator. It would be preferable to apply the maximum acceptable deceleration at a constant rate and thus stop the actuator in a shorter amount of time. Prior spring crash stops are inadequate in this respect.

With regard to the prior latch mechanisms, there are problems inherent in trying to provide an area contact between the attachment plate on the actuator and the magnetic poles of the latch mechanism. One problem is manifested in a widened or unfocused magnetic field around the latch mechanism which tends to draw the actuator to it prior to landing, or when still in operation. Such a field will tend to interfere with the normal operation of the disk drive. Another problem is the fact that any misalignment between the flat surfaces of the magnetic poles and plate of the actuator, resulting from inexact machining or assembly, creates certain air gaps therebetween which reduce the holding strength of the latch mechanism.

Another problem with prior art actuator designs has been the inclusion of metallic screws or bolts holding the actuator return flux cover plate to the base of the disk drive. These fasteners, along with other metallic leaf springs or crash stop assemblies, are necessarily disposed adjacent the actuator coil and between the poles of the actuator magnet. Thus, the magnetic flux path is diverted from the space through which the actuator coil moves and instead flows down through these elements around the periphery of the motor. Diversion of the flux path as such results in a reduced efficiency of the motor.

The present invention provides an apparatus which substantially overcomes the drawbacks associated with prior art rotary actuators.

SUMMARY OF THE INVENTION

The present invention relates to an actuator assembly which provides several novel and non-obvious features.

The actuator assembly consistent with the present invention includes a positioner arm assembly having a current coil attached at one end. The current coil is positioned above a magnet, within the magnetic field of the magnet, such that the positioner arm moves when current passes through the coil. A top return plate is disposed above the current coil so as to direct the magnetic field of the magnet up through and perpendicular to the current coil.

A particularly advantageous feature of the actuator assembly consistent with the present invention is that the top plate is held in place by the magnetic force of the magnet, and no extra screws or other fasteners are needed. This provides for simpler assembly, smaller and less expensive part count, lighter weight, and a non-diverted magnetic return path due to the absence of metal screws and the like. Furthermore, non-magnetic stand-offs are used to space the top plate above the rest of the actuator assembly. Consequently, there are no magnetic stand-offs to interfere with the desired return path of the magnetic field.

Another particularly advantageous feature of the actuator assembly consistent with the present invention is the included preloaded crash stop. The positioner arm assembly further includes a moving member which, in the preferred embodiment, is essentially a stub protruding from the rear of the positioner arm assembly. Under certain circumstances, when the disk drive fails, the stub impacts the preloaded crash stop. The preloaded crash stop is made of material that allows an elastic as well as dampening force to be applied to the moving member of the positioner arm assembly. This allows for stopping the positioner arm assembly in the shortest possible distance.

Furthermore, in the preferred embodiment, both the stopping member and the moving member of the crash stop are made of non-magnetic material. Accordingly, neither of the members interfere with the desired return paths of the magnetic field of the actuator assembly.

Furthermore, a feature of the actuator assembly consistent with the present invention is a magnetic latch which holds the positioner arm assembly in a fixed location when the disk drive is not operating. The magnetic latch of the preferred embodiment is integral to the preloaded crash stop. The magnetic latch of the preferred embodiment includes convex contact faces. Additionally, there is a contact plate on the moving member of the positioner arm assembly. The magnetic latch exerts a magnetic force on the contact plate when the contact plate is in contact with the convex contact faces. Because the faces are convex, the latch provides "line contact" between the faces and the plate. Line contact is advantageous over the surface contact of the prior art, where the contact faces and the contact plate are both flat, because a greater margin of error in positioning and assembling parts is acceptable in a latch using line contact.

DETAILED DESCRIPTION OF THE INVENTION

Figure 1:
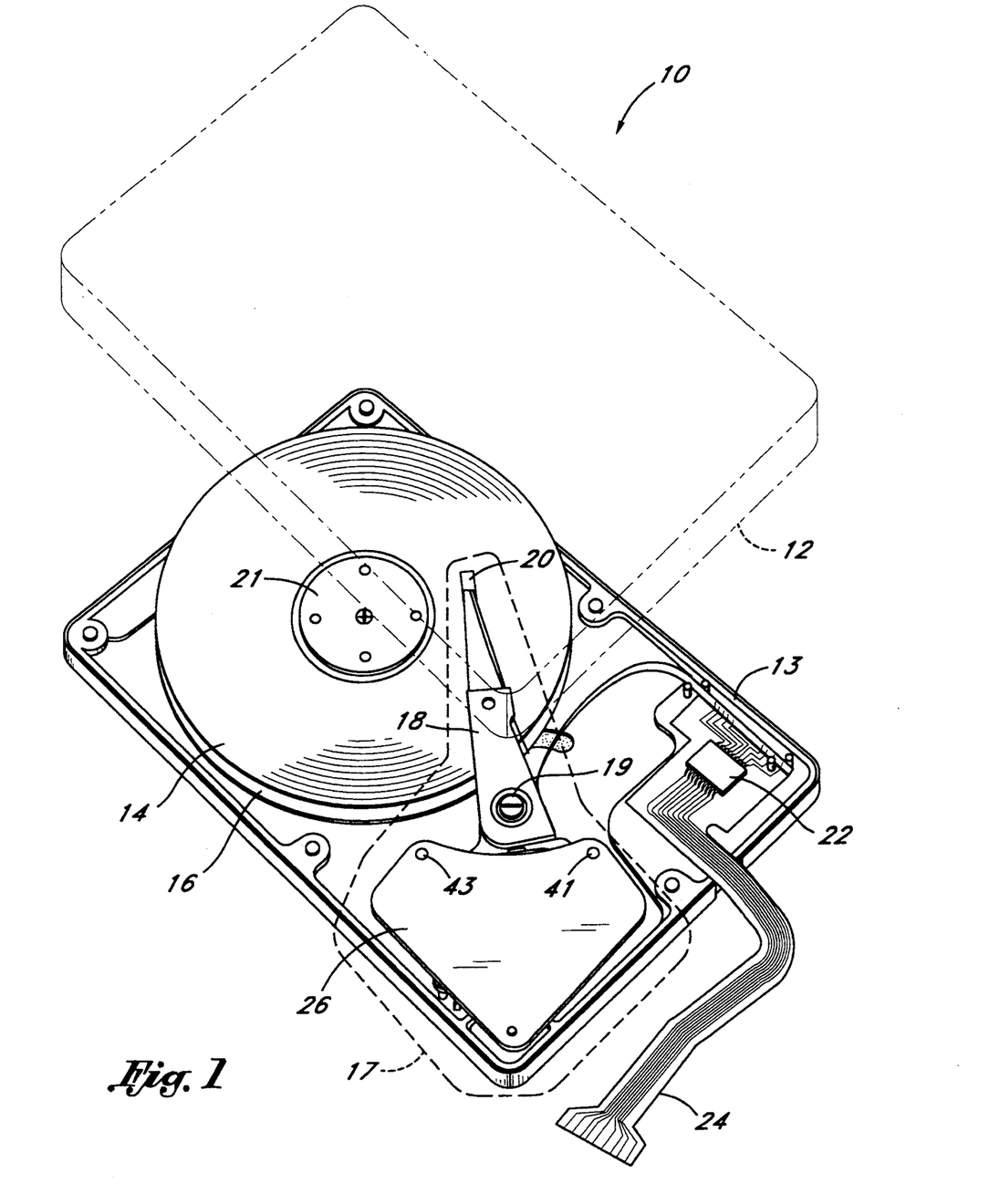
FIG. 1 is a perspective view of a disk drive in accordance with the present invention, showing the inside of the disk drive.

FIG. 1 is a perspective view of a disk drive 10 in accordance with the present invention. In the preferred embodiment, the disk drive 10 is a 2-½ inch form factor rotary disk drive for use in association with a digital computer.

A lid 12 of the disk drive is shown exploded and in phantom. In operation, the lid 12 would be disposed atop a housing 13.

The disk drive comprises two magnetic disk platters 14 and 16. The disk platters are made of conventional magnetic media such as thin film, which is capable of storing digital data in concentric tracks. In the preferred embodiment, both sides of each platter are available for storage. It will be recognized by one of ordinary skill in the art that the disk drive may comprise any number of such disks or platters.

The disks 14, 16 are fixed to a spindle motor 21. The spindle motor 21 is for rotating the disks to provide read/write access to the various portions of the concentric tracks.

An actuator assembly 17, in accordance with the present invention, is indicated by the dashed line of FIG. 1. The actuator assembly 17 includes a positioner arm assembly 18. The positioner arm assembly 18 includes a read/write head 20 at its distal end. Although only one read/write head of the positioner arm assembly 18 is shown, it will be recognized that the disk drive has one read/write head for each side of each disk included in the drive. The positioner arm assembly comprises a pivot 19 around which the positioner arm pivots.

The disk drive further includes a read/write chip 22. As is well known, the read/write chip 22 cooperates with read/write heads to read from and/or write to the disks. A first flexible printed circuit member 24 interfaces the chip 22 with associated drive electronics (not shown).

A top plate 26 is part of the actuator assembly 17. One of the functions of the actuator assembly 18 is to move the positioner arm assembly 18 around pivot 19. The specific operation will be detailed below.

Figure 2:
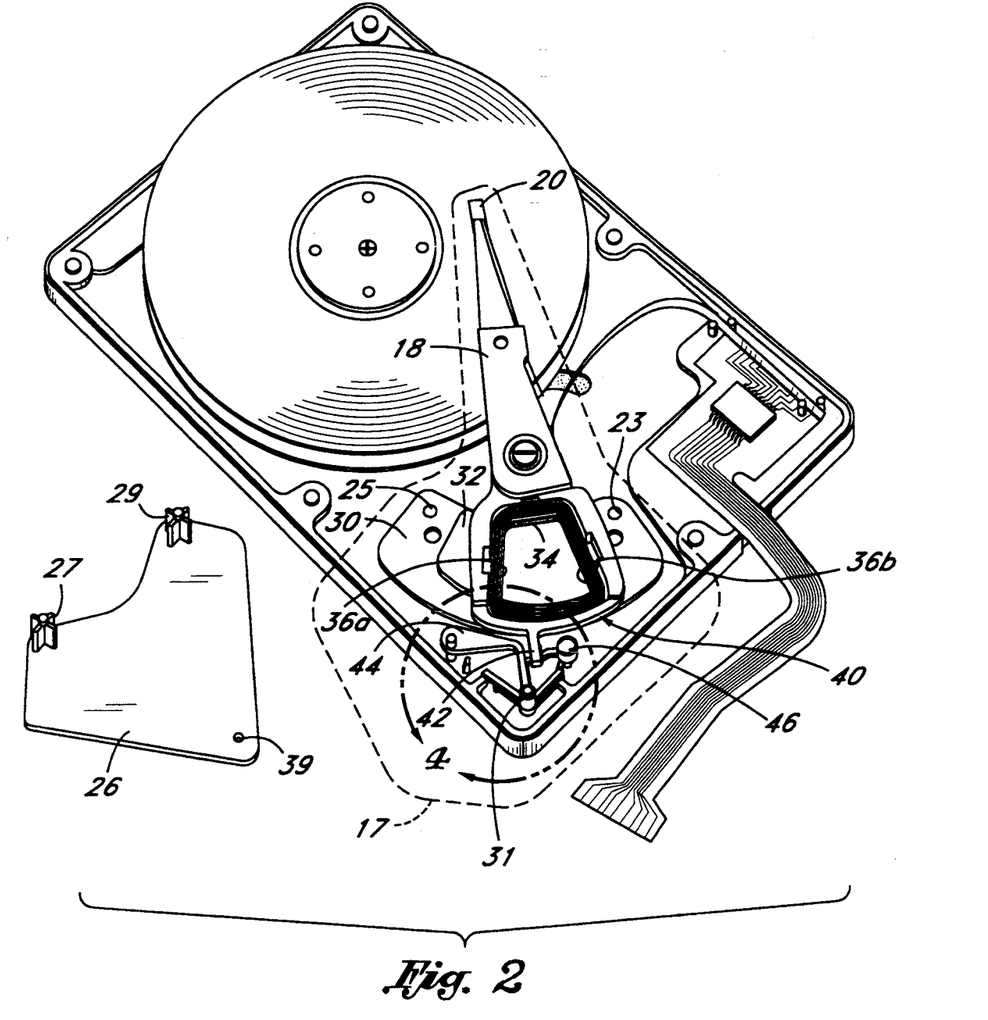
FIG. 2 is a perspective view of a disk drive in accordance with the present invention, showing the inside of the disk drive with the top plate of the voice coil motor removed.

Turning to FIG. 2, a perspective view of the disk drive is shown with the top plate 26 removed to reveal details of the remainder of the actuator assembly 17 and included positioner arm assembly 18. The actuator assembly 17 further comprises a bottom plate 30 and a magnet 32. In operation, the top plate 26 is spaced above the bottom plate 30 and magnet 32 with spacers 27 and 29. In the preferred embodiment, the spacers 27 and 29 are non-magnetic stand-offs formed from plastic of the polyetherimide resin type. The top plate 26 is further spaced above the bottom plate and the magnet by a post 31 which is formed integrally to the housing 13, as will be shown in more detail below. In the preferred embodiment, the top plate 26 is positioned above the bottom plate and the magnet 32 by mating the stand-offs 27, 29 with openings 23 and 25, in the bottom plate 30, respectively, and mating the post 31 with an opening 39 in the top plate 26. The positioner arm assembly 18 further includes a current coil 34. The current coil 34 has portions 36a and 36b which overlie the magnet 32 in a plane parallel to the plane of the magnet 32.

The bottom plate 30, the magnet 32, and the top plate 36, in combination with the current coil 34 substantially make up a voice coil motor which acts to position the positioner arm assembly, as is well known in the art. Specifically, current passing through the coil portions 36a and 36b interact with the magnetic field of the magnet 32, as is well known, so as to rotate the positioner arm assembly 18 around the pivot 19, thus positioning the read/write head 20 as desired.

FIG. 2 also shows a rear portion 40 of the positioner arm assembly 18. The rear portion 40 is the T-shaped portion that is joined at the back of the positioner arm assembly 18. The rear portion 40 includes a traveling member, or moving member, 42, which forms the base of the T-shape. In the preferred embodiment, the rear portion 40 comprises non-magnetic material formed of plastic of the polyetherimide resin type. The non-magnetic rear portion acts to break any current loop which might be formed by the metal portions of the remainder of the positioner arm assembly 18, and additionally allows for balancing the positioner arm assembly 18 around the pivot 19, as is well known to be desired in such disk drive actuator assemblies. Also, the non-magnetic material does not interfere with the magnetic field return paths associated with the voice coil motor operation.

The rear portion 40 and the included moving member 42 work in combination with a first stopping member 44 and a second stopping member 46, so as to provide a novel and non-obvious crash stop, which is detailed below.

Voice Coil Motor Assembly

Figure 3:
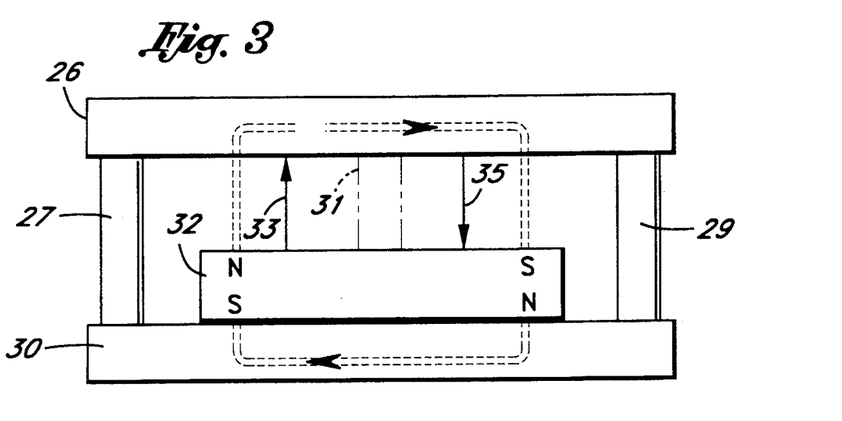
FIG. 3 is a schematic side view of the magnet and associated assembly of the voice coil motor in accordance with the present invention.

FIG. 3 is a schematic side view of the magnet 32 and associated components of the voice coil motor. The magnet 32 is disposed above the bottom plate 30. In the preferred embodiment, the bottom plate 30 is fixed to the housing 13 (not shown) with screws. Additionally, the magnet 32 is fixed to the bottom plate 30 with adhesive such as anaerobic compounds. The top plate 26 is disposed above the magnet, as shown in FIG. 3.

As illustrated by the arrowed/dashed lines in FIG. 3, the bottom plate 30 and the top plate 26 provide return for the magnetic field generated by the magnet 32. The arrangement provides for the magnetic field on the left side of the magnet flowing generally in the direction of the arrow 33, and the magnetic field on the right side of the magnet flowing generally in the direction of the arrow 35. As is well known, the interaction of the current coil 34 and the magnetic field produced by the magnet 32 cause motion of the positioner arm assembly 18.

The top plate 26 is held in position substantially solely due to the magnetic force emanating from the magnet 32. Additionally, the top plate 26 is spaced above the magnet by the non-magnetic spacers 27, 29, and the post 31 (shown in phantom). Referring briefly back to FIG. 1, the tops of the posts 27, 29 are shown as tops 41 and 43, respectively. In the preferred embodiment, the tops 41, 43 are ultrasonically bonded to the top plate 26. The arrangement described provides for a voice coil motor assembly which does not require screws or other fasteners for holding the top plate down above the remainder of the voice coil motor. The lack of screws or fasteners provides for a variety of advantages including fewer parts, simpler assembly and a lighter weight disk drive. Additionally, because the stand-offs 27, 29 are non-magnetic, they do not interfere with the return path of the magnetic field provided by the top plate 26 and the bottom plate 30, as indicated by the dashed/arrowed lines. This results in a more efficient voice coil motor for moving the positioner arm assembly 18 because the field is contained above the magnet 32 where it can interfere with the current coil 34.

Crash Stop

Figure 4:
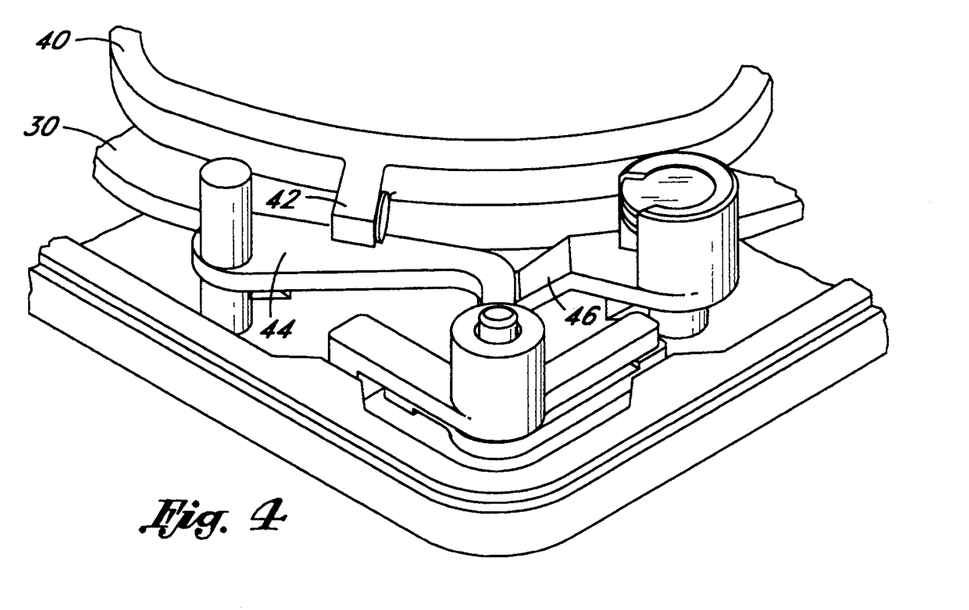
FIG. 4 is a partial perspective view illustrating a crash stop in accordance with the present invention.
Figure 5:
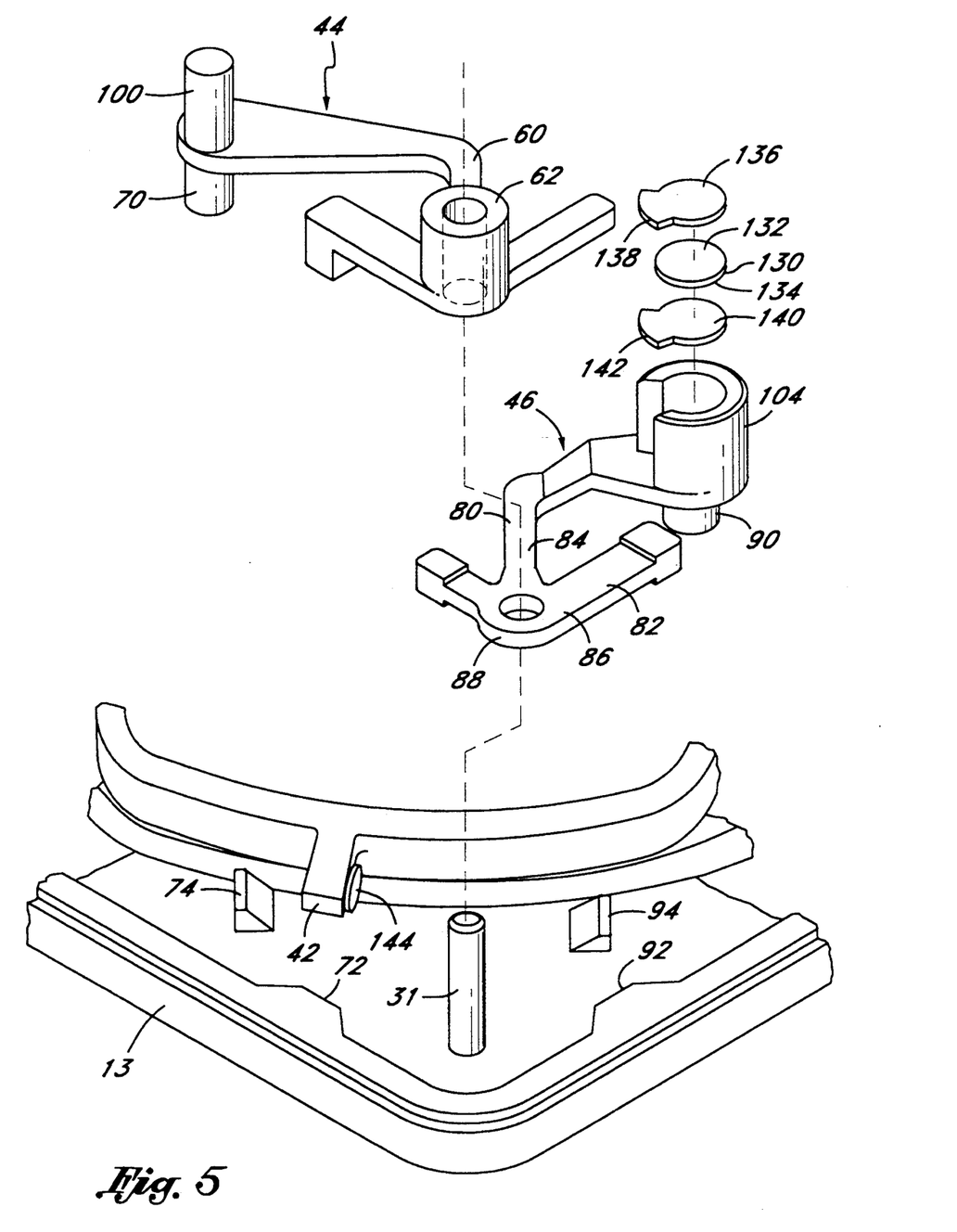
FIG. 5 is a partial perspective exploded view of a crash stop and of a magnetic latch in accordance with the present invention.
Figure 6:
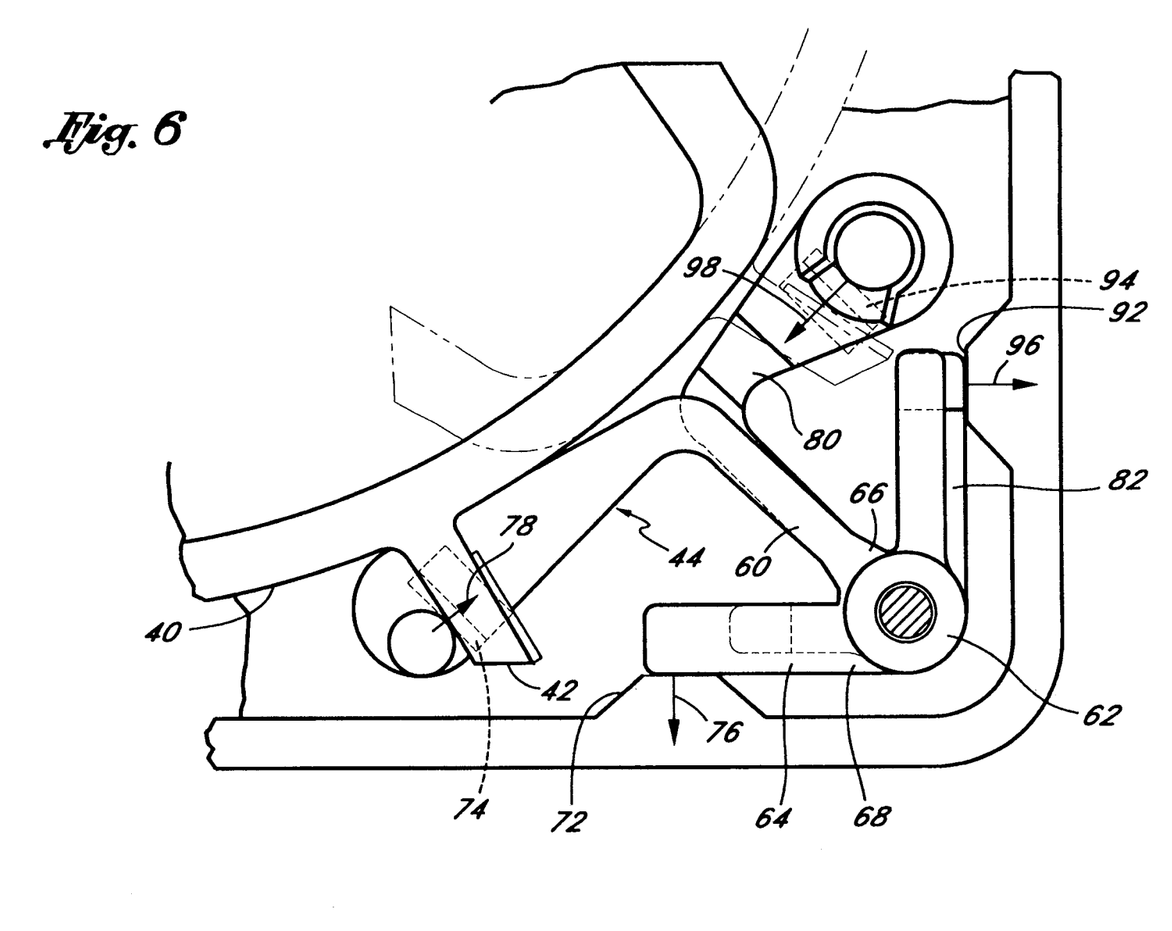
FIG. 6 is a partial top view illustrating the crash stop.

FIGS. 4–6 illustrate yet another novel and nonobvious feature of the actuator assembly 17 in accordance with the present invention, the crash stop. Referring to FIG. 4, a crash stop in accordance with the present invention comprises the rear portion 40, which includes the member 42. The crash stop additionally comprises the first stopping member 44, which comprises a preloaded spring. The preloaded spring 44 is shown clearly in FIG. 5.

Referring now to FIG. 6, the preloaded spring 44 includes a first flexing portion 60 which is the substantially L-shaped member originating at a hub 62 of the preloaded spring. The preloaded spring 44 further includes a restrained portion 64. The flexing portion 60 and the restrained portion 64 each have a first end 66, 68, respectively, which joined them to the hub 62 and thereby to each other.

Referring to FIG. 5, the flexing portion 60 further includes a first held member 70, disposed away from the flexing portion's first end 66 (hidden in FIG. 5). The crash stop further comprises a first wall 72 and a second wall 74. As best shown in FIG. 6, the first wall 72 is positioned to prevent the first restrained portion 64 from moving in a first direction indicated by an arrow 76. Additionally, the second wall 74 is disposed to prevent the first held member 70 from moving in a second direction indicated by an arrow 78. The unloaded dimensions of the first preloaded spring 44 are such that the spring must be flexed somewhat at the hub 62 during assembly in order to position the restrained portion 64 so as to abut the first wall 72 while positioning the held member 70 so as to abut the second wall 74. The flexing or preloading is accomplished by compressing the restrained portion 64 in the direction of the flexing portion 60. Thus, when the preloaded spring 44 is assembled and in position as shown in FIG. 4, the preloaded spring 44 is slightly flexed and therefore preloaded, as is well understood in the art.

The crash stop further includes the second stopping member 46 comprising a second preloaded spring. Referring to FIG. 5, the second preloaded spring comprises a second flexing portion 80 and a second restrained portion 82. The flexing portion 80 and the restrained portion 82 each have a first end 84 and 86, respectively, joining them to a hub 88 and thereby to each other.

This flexing portion 80 further includes a second held member 90, which is disposed away from the first end 84 of the flexing portion 80. The housing 13 further includes a third wall 92 and a fourth wall 94.

Referring to FIG. 6, the third wall 92 is positioned to prevent the restrained portion 82 from moving in a third direction indicated by an arrow 96. Additionally, the fourth wall 94 is positioned to prevent the held member 90 from moving in a fourth direction indicated by an arrow 98. The preloaded spring 46 is forced into a preloaded flexed position by the walls 92 and 94 in the same manner as the preloaded spring 44 is flexed by the walls 72 and 74. In the preferred embodiment the springs 44 and 46 are formed of plastic of the polyetherimide resin type which is non-magnetic. The springs will therefore not interfere with the magnetic field return paths associated with the operation of the voice coil motor.

As indicated in FIG. 5, when assembled, the hub 88 is seated over the post 31 and the hub 62 is seated over the post 31 above the hub 88. Thus, the second flexing portion 80 is disposed between the housing 13 and the first flexing portion 60. A portion of the post 31 extends above the hub 62 so as to be received by the opening 39 in the top plate 26 (shown in FIG. 2). As previously discussed, the top plate 26 is held down substantially only by magnetic force. Consequently, as is clear from the figures, this arrangement allows the assembly of the crash stop, including the springs 44 and 46, without extra fasteners to hold the crash stop components in place.

Figure 7:
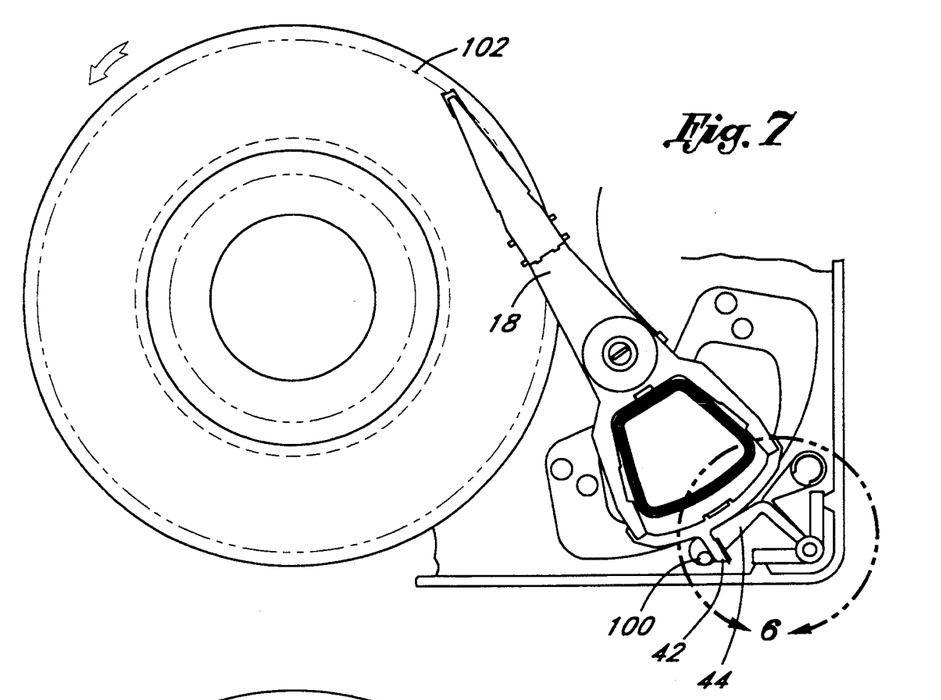
FIG. 7 is a partial top view of the disk drive, illustrating the positioner arm assembly stopped at its outer limit by the crash stop.
Figure 8:
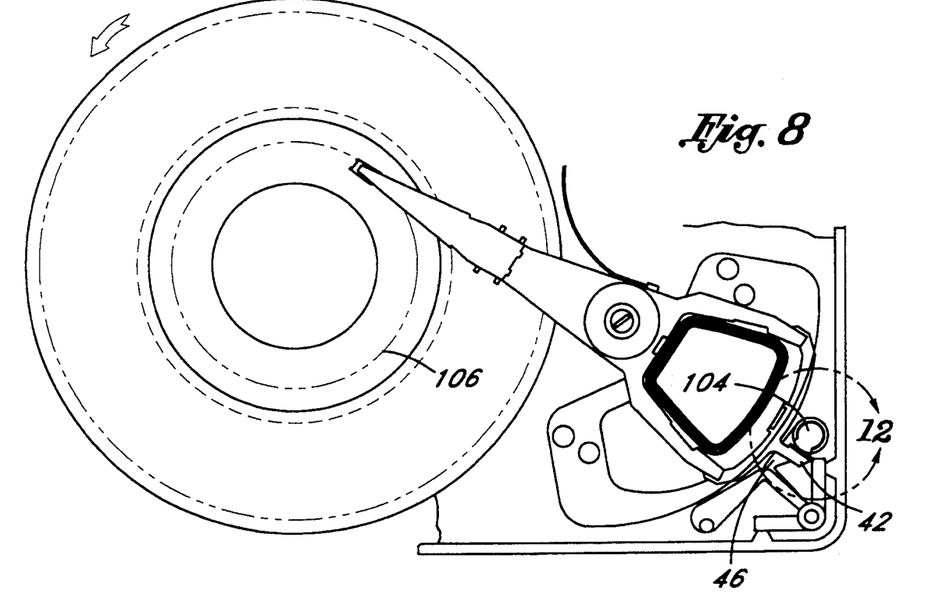
FIG. 8 is a partial top view of the disk drive, illustrating the positioner arm assembly stopped at its inner limit by the crash stop.

FIGS. 7 and 8 illustrate how the crash stop in accordance with the present invention limits the motion of the positioner arm assembly. When the moving member 42 strikes a stopping post 100 (the post 100 shown in perspective in FIG. 5) of the preloaded spring 44, the positioner arm assembly 18 is substantially stopped at the radial position indicated by the phantom line 102 in FIG. 7. Likewise, when the moving member 42 strikes a stopping post 104 (the post 104 shown in perspective in FIG. 5) of the preloaded spring 46, the positioner arm assembly is substantially stopped at the radius position indicated by phantom line 106.

It will be recognized that if the disk drive loses power or fails in some other manner while the positioner arm assembly 18 is moving in one direction or the other, the arm will reach the limit of its range of motion and stop. If the stop occurs substantially instantaneously, the positioner arm assembly 18 and the read/write head 20 at its distal end may experience decelerations large enough to be damaging. The crash stop provides the function of preventing the positioner arm assembly and the read/write head 20 at its distal end from experiencing unacceptable decelerations by stopping the positioner arm assembly 18 over a distance.

As is well understood, the longer the stopping distance, the lower the deceleration. Referring to FIG. 7, when the stopping post 100 is impacted by the moving arm 42, it displaces some amount which translates into the space outside of the radius 102. Thus, during normal operation, the space outside of the radius 102 is not available for storage of digital information because it cannot be accessed by the read/write head 20; likewise with respect to the space within the radius 106 in FIG. 8. Accordingly, it is desirable to stop the positioner arm assembly in as short a distance as possible without exceeding the acceptable deceleration limit. The present invention accomplishes this by providing an elastic and dampening resistive stopping force.

The rear portion of the positioner arm assembly 18 and the moving member 42 are formed of the non-magnetic material which preferably is plastic of the polyetherimide resin type. The preloaded springs 44, 46 are formed of the same material. The material has the property such that when the moving member 42 impacts either of the posts 100, 104 of the preloaded springs 44, 46, respectively, a resistive elastic force, as well as a resistive dampening force, is imparted to the moving member.

Figure 9A:
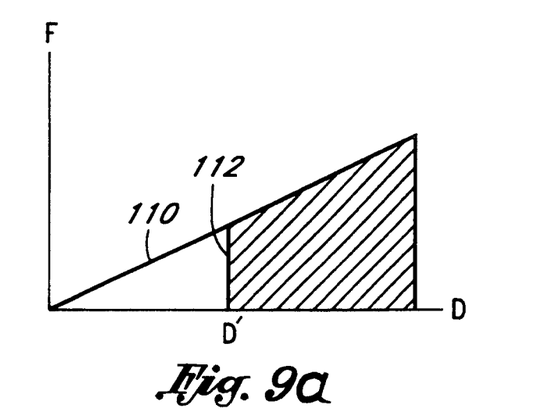
FIGS. 9a-c are graphical representations of force versus distance characteristics associated with the crash stop.
Figure 9B:
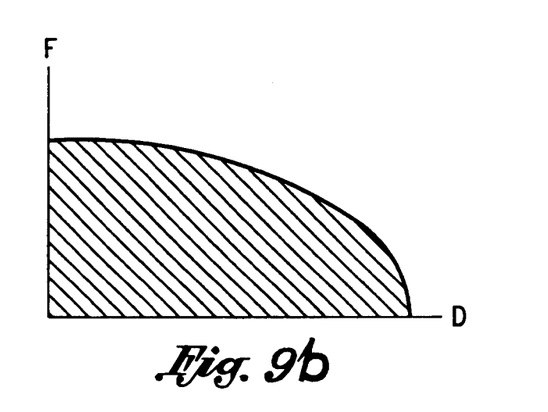
Figure 9C:
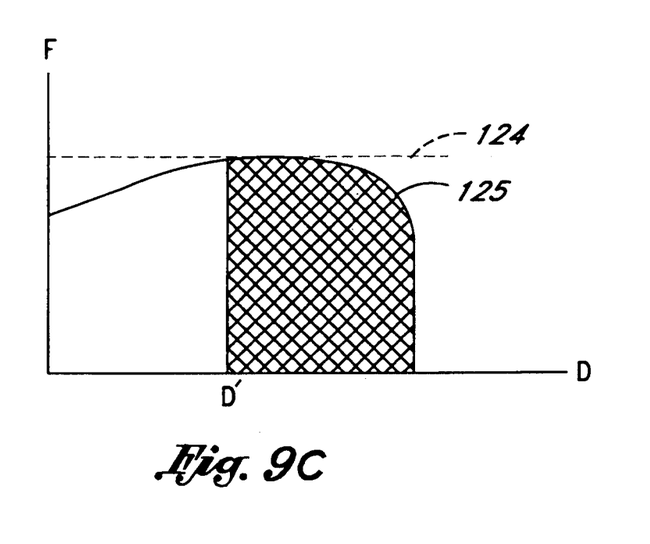

FIGS. 9a–c illustrate the forces involved in stopping the moving member, and thus the positioner arm assembly upon a crash. FIG. 9a illustrates the force resulting from a purely elastic stop. The axis marked "F" is the force applied to the object being stopped, i.e., the moving member 42. The axis labeled "D" is the distance over which the moving member has encountered the force, i.e., the distance through which the spring is displaced. The curve 110 indicates the typical spring force curve beginning at a force of zero at the origin and ramping upward in force at a constant slope. The line 112 indicates the starting position of the force curve in a system wherein the spring is preloaded, i.e., already displaced a distance D'. The shaded area under the curve is the amount of kinetic energy which is absorbed from the moving member into the displaced spring, thus stopping the moving member.

FIG. 9b illustrates the analogous force curved for a purely dampened stop. As is well known, a damping element will exert a force proportional to the velocity of the object displacing the element. Therefore, the force is at a maximum when the moving member initially encounters the dampening force and falls off as the moving member is slowed to a stop.

The curve 125 of FIG. 9c illustrates the sum of the elastic force of FIG. 9a and the dampening force of FIG. 9b. Thus, FIG. 9c illustrates a system which includes an elastic and a dampening resistive force, such as the crash stop of the preferred embodiment of the present invention.

As can be seen in FIG. 9c, the preloaded spring elastic force (preloaded to a distance D' as discussed above and indicated by curve 125), in combination with the dampening force, dissipates the maximum amount of energy over the shortest distance, while not exceeding a maximum allowable force indicated by dashed line 124. It is well understood that force is proportional to deceleration. Thus, the maximum allowable deceleration is not exceeded. Accordingly, the crash stop in accordance with the present invention, which applies both preloaded elastic as well as dampening resistive forces to stop the moving member, is capable of stopping the moving member over the shortest possible distance without exceeding the allowable deceleration. Consequently, the amount of wasted disk space is minimized.

Magnetic Latch

Returning now to FIG. 5, an additional novel and nonobvious advantageous feature of the actuator assembly of the present invention is illustrated. As explained in the summary section of the present description, it is desirable to hold the positioner arm assembly 18 in place once it is parked. According to the present invention, this is accomplished with a magnetic latch. In the preferred embodiment, a magnetic latch in accordance with the present invention is formed integrally with the preloaded spring 46, in the stopping post 104. The magnetic latch comprises a magnet 130 having a first side 132 and a second side 134 which is hidden in the perspective view of FIG. 5. A first pole member 136 is disposed adjacent to the first side 132 of the magnet 130. The first pole member has a first contact face 138. A second pole member 140 is disposed adjacent to the second side 134 of the magnet 130. The second pole member 140 has a contact face 142.

The magnetic latch further comprises a contact plate 144 disposed on a face of the moving member 42 which opposes the magnetic latch. The contact face 138 of the first pole member and the contact face 142 of the second pole member are convex in shape.

Figure 10:
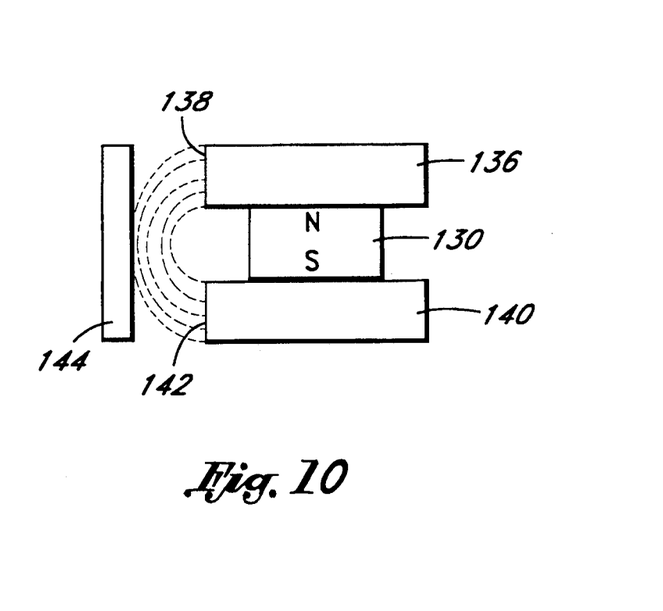
FIG. 10 is a schematic side view of a magnetic latch in accordance with the present invention.

FIG. 10 is a side schematic view of the magnetic latch of the preferred embodiment. FIG. 10 illustrates that the first pole member 136 and the second pole member 140 act to direct the magnetic field emanating from the magnet 130 out and toward the contact plate 144. Under normal circumstances, when the disk drive ceases operation, the contact plate 144 attached to the moving member 42 is positioned against the contact faces 138 and 142 of the pole members 136 and 140, respectively. As is illustrated by the dashed magnetic field lines of FIG. 10, the contact plate 144 comes under the influence of the magnetic field produced by the magnet 130 as it approaches the contact faces 138 and 142. Thus, the contact plate 144 is magnetically latched to the contact faces 138 and 142.

Figure 11:
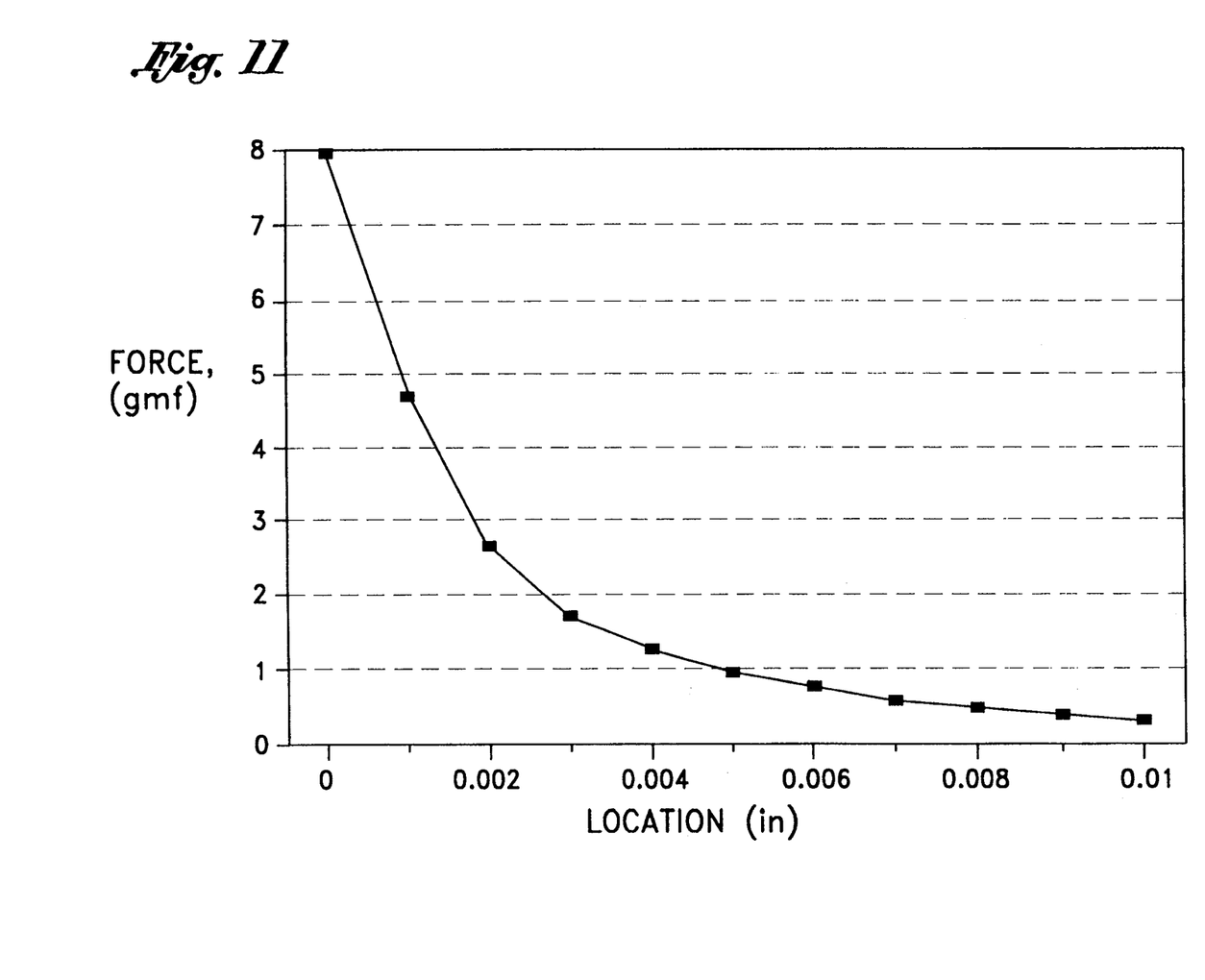
FIG. 11 is a graph illustrating the force exerted by the magnetic latch on the contact plate of the positioner arm assembly.

FIG. 11 is a graph indicating the force of the magnetic latch on the contact plate 144 as a function of distance between the plate and the latch. The notable feature is that very little force is exerted on the contact plate 144 by the magnetic field of the latch until the contact plate 144 is extremely close to the contact faces 138 and 142. In the preferred embodiment, the force is less than 0.4 gmf (grams, force) when the contact plate 144 is further than 1/100th of an inch (0.01 in) from the contact faces 138 and 142. The magnetic force is approximately 8 gmf when the contact plate 144 is in contact with the contact faces 138 and 142. Such a force curve is particularly advantageous in magnetic latches. When the contact plate is in contact with the contact faces, a fairly strong force (8 gmf, in the preferred embodiment) holds the positioner arm in place. Nevertheless, at any appreciable distance, negligible force is exerted on the positioner arm. Thus, the force of the magnetic latch does not interfere with the movement of the positioner arm assembly during normal operation.

Figure 12:
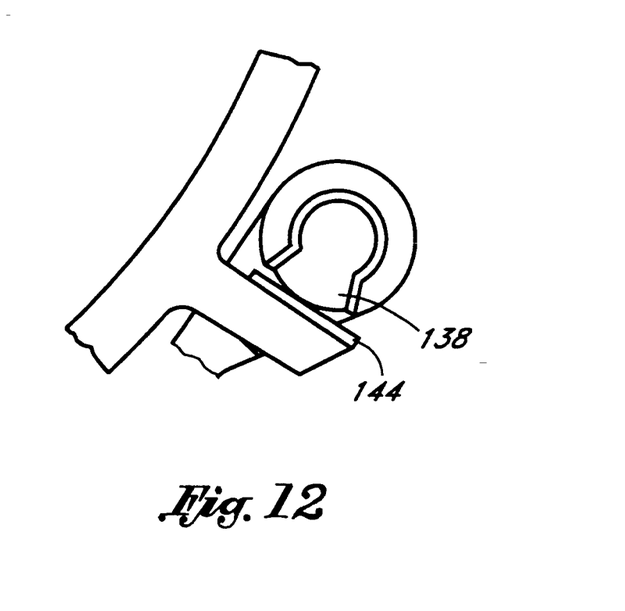
FIG. 12 is a partial top view illustrating the magnetic latch.

FIG. 12 is a partial top view of the magnetic latch. FIG. 12 illustrates the mating of the contact plate 144 with the convex contact faces. The convex faces are particularly advantageous because they provide a "line contact" with the contact plate 144, wherein the mating occurs along a line rather than across a plane, as may be found in the prior art. Line contact is advantageous over surface or plane contact because a greater margin of error in positioning and assembling parts is acceptable in the present latch using line contact. Where a slight misalignment might cause gaps in a surface contact arrangement, it will be recognized in view of the present disclosure that line contact will be maintained even in the event of misalignment or misassembly of parts in a variety of directions.

The many features and advantages of the disk drive and associated actuator assembly of the present invention will be apparent to those skilled in the art from the description of the preferred embodiments and the drawings. Thus, the following claims are intended to cover all modifications and equivalents falling within the scope of the invention.

We claim:

1. A crash stop of a disk drive actuator assembly comprising:
   a moving member mounted on said actuator assembly so as to traverse a path;
   a first stopping member having a stopping element disposed in said path comprising a first preloaded spring, the first preloaded spring comprising a first flexing portion and a first restrained portion, each portion having respective first ends, the first flexing portion and the first restrained portion joined at their respective first ends at a hub; the first flexing portion comprising a first held member disposed away from the first flexing portion first end;
   a housing comprising a hub-receiving pin, a first wall and a second wall, the first wall disposed to prevent the first restrained portion from moving in a first direction and the second wall disposed to prevent the first held member from moving in a second direction, the positioning of said hub on said pin and prevention of motion of the first restrained portion and the first held member, simultaneously, causing preloading of the first preloaded spring; and
   wherein the moving member traversing said path impacts the first stopping member and the first stopping member acts to stop the moving member over a distance.

2. The crash stop of claim 1, further comprising a second stopping member having a stopping element disposed in said path comprising a second preloaded spring, the second preloaded spring comprising a second flexing portion and a second restrained portion, each portion having respective first ends, the second flexing portion and the second restrained portion being joined at their respective first ends at a hub; the second flexing portion comprising a second held member disposed away from the second flexing portion first end;
   the housing comprising a hub-receiving post, a third wall and a fourth wall, the third wall disposed to prevent the second restrained portion from moving in a third direction and the fourth wall disposed to prevent the second held member from moving in a fourth direction, the positioning of said second stopping member hub on said hub-receiving post and prevention of motion of the second restrained portion and the second held member, simultaneously, causing preloading of the second preloaded spring; and
   wherein the moving member traversing said path impacts the second stopping member and the second stopping member acts to stop the moving member over a distance.

3. The crash stop of claim 2, wherein the second flexing portion is disposed between the housing and the first flexing portion.

4. The crash stop of claim 2, wherein the first stopping member stops the moving member by imparting both a resistive elastic force and a resistive dampening force to the moving member; the first stopping member and the moving member comprising substantially nonmagnetic material.

5. The crash stop of claim 2, wherein the moving member comprises a contact plate mounted thereon and positioned to impact the stopping element of the second stopping member.

6. The crash stop of claim 5, wherein the stopping element of the second stopping member includes a magnetic member positioned to contact the contact plate of the moving member upon impact of the moving member with the stopping post of the second stopping member, said contact plate being constructed of a magnetic material.

7. The crash stop of claim 6, further comprising:
a first pole member disposed adjacent to a first side of the magnetic member, the first pole member having a contact face;
a second pole member disposed adjacent to a second side of the magnetic member, the second pole member having a contact face;
wherein the contact plate of moving member contacting the contact face of the first pole member and the contact face of the second pole, simultaneously, so as to be held against the contact face by magnetic forces emanating from the magnetic member.

8. The crash stop of claim 2, wherein said hub receiving pin and said hub receiving post are one element.

9. A crash stop comprising:
a travelling member;
a stopping member;
the stopping member made of a one-piece plastic spring element having a flexing portion cantilevered about a first end and having a second end disposed in a path of movement of the travelling member, the stopping member acting to stop the travelling member over a distance; and
the stopping member stopping the travelling member by imparting both a resistive elastic force and a resistive dampening force to the traveling member resulting from bending of said flexing portion second end upon contact with said travelling member;
the stopping member and the travelling member comprising substantially non-magnetic material;
wherein the stopping member comprises a preloaded spring, the preloaded spring comprising said flexing portion and a restrained portion, each portion having respective first ends, the flexing portion and the restrained portion being joined at their respective first ends at a hub; the flexing portion comprising a held member disposed away from the flexing portion first end; and
the crash stop further comprising a housing comprising a hub-receiving pin, a first wall and a second wall, the first wall positioned to prevent the restrained portion from moving in a first direction and the second wall positioned to prevent the held member from moving in a second direction, the positioning of said hub on said pin and prevention of motion of the restrained portion and the held member, simultaneously, causing preloading of the preloaded spring.

10. A crash stop for a disc drive actuator, the actuator having a voice coil motor including magnetic components defining a space within which a coil attached to a positioning arm is disposed, the crash stop comprising:
a moving member attached to the arm;
a first stopping member having a stopping element positioned in a path of movement of the moving member, said stopping member comprising a one-piece non-magnetic spring including a hub positioned without fastening means at a fixed location relative a disc drive housing, the housing having a first wall and a second wall, said hub having an outwardly extending flexing portion on which is located the stopping element and an outwardly extending restraining portion, said stopping element comprising a preloaded crash stop for said moving member with said hub positioned at said fixed location, said restraining portion positioned against the first wall of said housing and said flexing portion positioned against the second wall of said housing, said flexing portion being cantilevered about said hub and flexed against said second wall so that said stopping element is spring biased against a first movement direction of said moving member along said path.

11. The crash stop of claim 10, wherein said moving member is constructed of a non-magnetic material.

12. The crash stop of claim 11, further comprising a second stopping member having a stopping element positioned in said path of movement of the moving member, said second stopping member comprising a one-piece non-magnetic spring including a hub positioned without fastening means at a fixed location relative said disc drive housing, said housing further having a third wall and a fourth wall, said hub having an outwardly extending flexing portion on which is located the stopping element and an outwardly extending restraining portion, said stopping element comprising a preloaded crash stop for said moving member with said hub positioned at said fixed location, said restraining portion positioned against the third wall of said housing and said flexing portion positioned against the fourth wall of said housing, said flexing portion being cantilevered about said hub and flexed against said fourth wall so that said stopping element is spring biased against a second movement direction opposite said first direction along said path.

13. The crash stop of claim 10, wherein the moving member comprises a contact plate mounted thereon and positioned to impact the stopping element of the second stopping member, and wherein the stopping element of the second stopping member includes a magnetic latch positioned in said path to contact the contact plate, said contact plate being constructed of a magnetic material.

14. The crash stop of claim 13, wherein said magnetic latch has a convex shape so as to contact said contact plate in substantially a line.

15. The crash stop of claim 14, wherein said magnetic latch further comprises:
a magnetic member;
a first pole member disposed adjacent to a first side of the magnetic member, the first pole member having a convex surface;
a second pole member disposed adjacent to a second side of the magnetic member, the second pole member having a convex surface;
wherein the contact plate of the moving member contacts the convex surfaces of the first pole member and second pole member simultaneously so as to be held against the magnetic latch by magnetic forces emanating from the magnetic member.

* * * * *